United States Patent

[11] 3,623,772

| [72] | Inventor | William D. Walther<br>Dayton, Ohio |
|---|---|---|
| [21] | Appl. No. | 4,705 |
| [22] | Filed | Jan. 21, 1970 |
| [45] | Patented | Nov. 30, 1971 |
| [73] | Assignee | The Dayton Steel Foundry Company<br>Dayton, Ohio |

[54] DUAL WHEEL SPACER
6 Claims, 2 Drawing Figs.

[52] U.S. Cl. .............................................. 301/13 SM
[51] Int. Cl. ....................................................... B60b 11/06
[50] Field of Search ................................... 301/12, 13, 13 S, 13 M, 19, 20

[56] References Cited
UNITED STATES PATENTS

| 2,767,026 | 10/1956 | Walther | 301/13 SM |
| 3,079,200 | 2/1963 | Main | 301/13 SM |
| 3,421,797 | 1/1969 | Walther | 301/13 SM |
| 3,090,649 | 5/1963 | Walther | 301/13 SM |

FOREIGN PATENTS

| 1,453,041 | 8/1966 | France | 301/13 SM |
| 1,528,409 | 4/1968 | France | 301/13 SM |
| 930,192 | 7/1955 | Germany | 301/13 SM |
| 930,850 | 7/1955 | Germany | 301/13 SM |

*Primary Examiner*—Richard J. Johnson
*Attorney*—Mack D. Cook, II

ABSTRACT: Spacer for use in mounting dual tires on a truck wheel. Spacer is axially deformable having side portions or wings which are radially deflectable yet will positively maintain clearance between the tires.

PATENTED NOV 30 1971 3,623,772
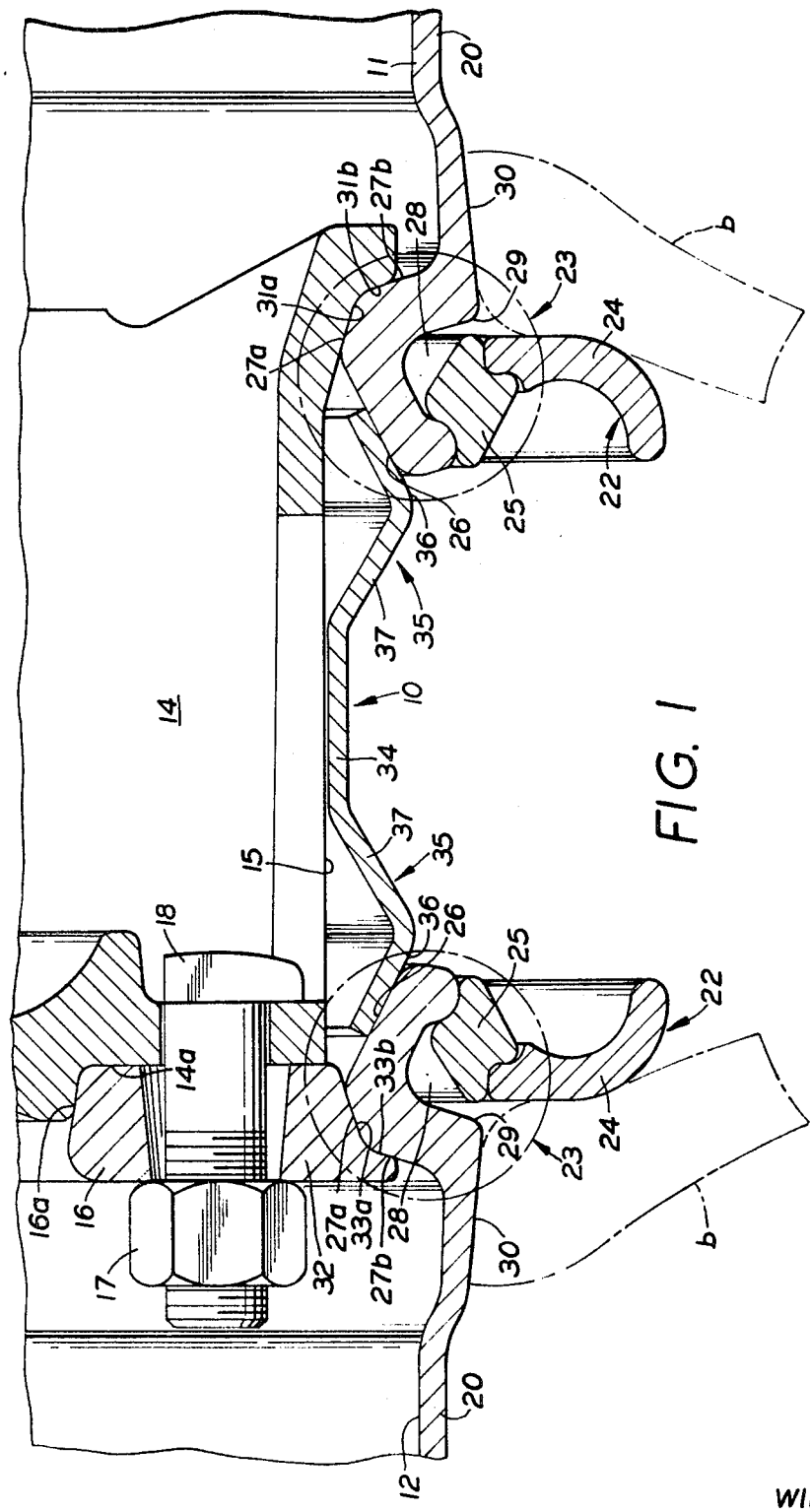
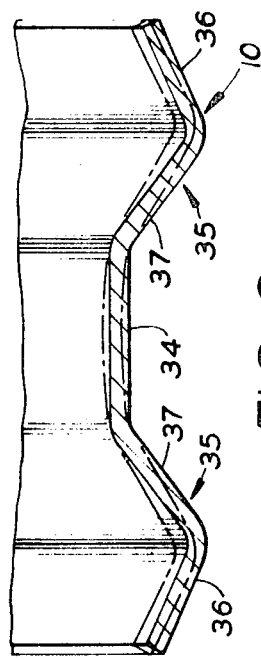
INVENTOR.
WILLIAM D. WALTHER
BY Hamilton, Cook,
Renner & Kenner
ATTORNEYS

DUAL WHEEL SPACER

BACKGROUND OF THE INVENTION

The invention relates to improvements in spacers, spacer bands or separating means used in mounting dual tires on a vehicle wheel.

A conventional assembly for mounting dual tires, as illustrated by U.S. Pat. No. 2,767,026 granted Oct. 16, 1956 to The Dayton Steel Foundry Company as assignee of George Walther, Sr., includes the vehicle wheel, inner and outer rims mounting the tires, a spacer, and clamping elements for secure mounting of the inner rim spacer outer rim assembly on the felloe of the wheel.

The purpose of the spacer, which is an annular ring, is to maintain the inner and outer rims in a predetermined spaced-apart condition axially of the wheel to provide clearance for the dual tires.

Conventional spacers have assumed a variety of shapes and forms. See, U.S. Pat. No. 1,109,173 granted Sept. 1, 1914 to The Firestone Tire & Rubber Company as assignee of C. A. Myers; U.S. Pat. No. 2,100,626 granted Nov. 30, 1937 to The Firestone Steel Products Co. as assignee of W. S. Brink; U.S. Pat. No. 2,767,026 referred to above; U.S. Pat. No. 3,013,841 granted Dec. 19, 1961 to The Dayton Steel Foundry Company as assignee of D. A. Walther; U.S. Pat. No. 3,143,376 granted Aug. 4, 1964 to The Firestone Tire & Rubber Company as assignee of M. A. Di Federico; and U.S. Pat. No. 3,194,606 granted July 13, 1965 to The Dayton Steel Foundry Company as assignee of William D. Walther, the present inventor.

Irrespective of the particular shape and form of the conventional and prior art spacers, as identified above, each has the common characteristic of strong and rigid lateral flanges or marginal portions carried by a noncompressible medial portion engineered or constructed to maintain the flanges in fixed relative position when in operative contact or abutment with the rims to receive the lateral thrust of the rims. In other words, the prior art spacers have edges which are intended to mechanically restrict and prevent any relative movement of the inner and outer rims assembled with the spacers on the wheel and held in place by pressure of the clamping elements.

However, it has been found that the prior art spacers can be and have been permanently deformed by improper mounting, application of excessive clamping pressure, stresses or shocks during vehicle use, unbalanced inflation pressures in the dual tires, etc. A deformed spacer band, unless detected and corrected, is not desirable.

SUMMARY OF THE INVENTION

It is the object of the present invention to provide an improved spacer for use in an assembly for mounting dual tires.

An improved spacer according to the invention is axially deformable and has circumferentially extending side portions or wings which are radially deflectable so that when the spacer is located radially of the wheel between the inner and outer rims and the clamping means is tightened in place, the spacer wings will deflect and the elastic deformation or reactive forces then present will positively maintain the inner and outer rims in a predetermined spaced-apart condition axially of the wheel to provide clearance for the dual tires.

Other objects of the invention and advantages thereof will be apparent in view of the following detailed disclosure considered in conjunction with the drawings.

DESCRIPTION OF THE DRAWINGS

FIG. 1 is a partial side elevation of a spacer embodying the concept of the present invention in a dual-rim assembly.

FIG. 2 is a cross section of the spacer shown in FIG. 1 with the predeflection configuration indicated in full lines and the operative position with radial deflection indicated by the chain lines.

DESCRIPTION OF THE INVENTION

An improved spacer according to the invention, referred to generally by the numeral 10, is used between an inner rim 11 and an outer rim 12 to mount dual tires (not shown) on a wheel 14 attached to a vehicle axle (not shown). The wheel 14 has a felloe 15 (felly surfaces) and carries the inner rim 11, the spacer 10 and the outer rim 12 which are secured to the wheel by clamping means such as a clamp lug 16 held by a nut 17 threaded on a bolt 18 positioned radially of the wheel adjacent the felly surface 15. When tightened, each clamp lug 16 is received within a socket surface 16a and bottomed or moved against mating surfaces 14a on the axially outer face of the wheel 14.

The demountable tire rims 11 and 12 suitable for use with the spacer 10 may have the construction as shown in FIG. 1, and, as more fully described in U.S. Pat. No. 3,421,797 an application for reissue thereof having been filed Nov. 19, 1969, granted Jan. 14, 1969, to The Dayton Steel Foundry Company as assignee of William D. Walther, the present inventor.

Each rim 11 and 12 has fixed and removable bead flanges separated by an annular rimbase portion 20. The fixed flange 21 (not shown) is formed integrally with the rimbase portion 20. The removable flange 22 is carried on and mounted within an edge 23 (indicated as the area within chain line circles) of the rimbase portion 20. As shown, the removable flange 22 is in a two-piece form having a radially directed side portion 24 for confining the axially outer edge of a tire bead $b$ and a specially shaped inner or base portion 25. In the two-piece form, the mating faces of flange portions 24 and 25 are suitably notched, as shown, for secure mechanical engagement. Alternatively, the removable flange may be in the one-piece form also described in the aforementioned U.S. Pat. No. 3,421,797.

The radially inner portion of rim edge area 23 has an outer axially inclined surface 26 intersecting an inner axially inclined surface 27a. The radially outer portion of the rim edge area 23 has a radially inwardly concave area 28 providing a cove surface for full mechanical seating of a correspondingly shaped mating face of the base portion 25 of the removable flange 22. The cove surface defined by the concave area is located between surface 26 and surface 27a and terminates radially inwardly of a shoulder 29 on the rimbase portion 20. Extending outwardly from surface 27a is a substantially radially directed rim-aligning surface 27b.

The rims 11 and 12 also have an integral surface 30 tapered at 5° to 18° for seating the radially inner portion of a tire bead $b$, there being a radially exposed portion of the cove area 28 between the removable flange 22 and the rim shoulder 29 adapted to receive the radially inner axially outer edge of a tire bead $b$.

The felly surfaces 15 of a wheel 14 terminate at the axially inner end thereon in an axially bevelled (for example 28°) rim-mounting surface 31a and a substantially radially directed rim-aligning surface 31b. Surfaces 27a and 27b of the inner rim 11 seat on and against the corresponding facing felly surfaces 31a and 31b.

Each clamp lug 16 has a radially oriented or upright leg 32 with an axially inner face having an axially bevelled (for example 28°) rim-mounting surface 33a and a substantially radially directed rim-aligning surface 33b. Surfaces 27a and 27b of the outer rim 12 seat on and against the corresponding facing clamp lug surfaces 33a and 33b.

The improved annular spacer 10 has a medial or body portion 34 of a diameter such as to slidably seat on the felly surfaces 15 of a wheel 14. Axially directed side portions or wings, indicated generally by the numeral 35, extend laterally of the body portion 34 and are radially spaced from the felly surfaces 15.

Each spacer wing 35 has an axially outer portion providing an inclined reactive surface 36 for full surface seating on and in contact with a mating area of an axially inclined surface 26 on a rim 11 or 12. Each axially outer portion extends radially outwardly to intersect at an obtuse angle substantially as shown, an axially inner portion 37 extending radially outwardly from the spacer body portion 34. The body portion 34 must have sufficient rigidity or adequate structural strength so as to transmit the mechanical forces attendant on axial movement of the rims (11 and 12) toward each other to the wings 35 which are radially deflected, without permanent deformation, causing reactive forces to be exerted on the rims through an axially inclined surfaces 36.

As shown in FIG. 1, when the nuts 17 are tightened on bolts 18 moving the clamp lugs 16 axially inwardly into the socket 16a and against the mating surfaces 14a on the wheel 14, the outer rim 12 will move axially of the felloe 15 (to the right as shown in FIG. 1) toward the inner rim 11 until the clamp lugs 16 bottom or come into contact with the axially outer face of the wheel 14. The axial distance between the felly surface 31b and the clamp lug surface 33b will thus be established and will remain constant until the bolts 18 are loosened. When the rims 11 and 12 move toward each other the resultant radial deflection of the spacer wings 35 (shown in FIG. 2, from the full line position to the chain line position) will positively maintain the rims in a spaced-apart condition within acceptable tolerances of axial runout and radial play.

I claim:

1. An assembly of an inner rim—dual-wheel spacer—outer rim secured by clamp lugs on a wheel, wherein said wheel has a felloe (15) terminating at the axially inner end thereof in an axially bevelled rim-mounting surface (31a) and a substantially radially directed rim-aligning surface (31b), said clamp lugs having a radially oriented leg (32) with an axially inner face having an axially bevelled rim-mounting surface (33a) and a substantially radially directed rim-aligning surface (33b), said rims each having an axially inwardly inclined surface (26) engaging said axially outwardly inclined wings (36) of said spacer, said wings providing a full surface for mating with said inclined surface, said rims each having also an axially outwardly inclined surface (27a) intersecting a substantially radially directed surface (27a), and said spacer is axially deformable so that when the clamp lugs are tightened to bottom against a mating surface (14a) on the axially outer face of said felloe, the spacer will elastically deform and the reactive forces then present will positively maintain the rims in a spaced-apart condition with acceptable axial runout and radial play.

2. An assembly according to claim 1, wherein said spacer has a medial portion seated on said felloe and wings extending laterally of said medial portion which are inwardly radially deflectable.

3. An assembly according to claim 1, wherein said wings are radially spaced from said felloe.

4. An assembly according to claim 1, wherein said wings have an axially inner portion and an axially outer portion.

5. An assembly according to claim 4, wherein said inner portion extends radially outward and said outer portion has an inclined reactive surface which contacts said rims.

6. An assembly according to claim 5, wherein said inner and outer portions intersect at an obtuse angle.

* * * * *

UNITED STATES PATENT OFFICE
CERTIFICATE OF CORRECTION

Patent No. 3,623,772      Dated November 30, 1971

Inventor(s) William D. Walther

It is certified that error appears in the above-identified patent and that said Letters Patent are hereby corrected as shown below:

Col. 1, line 13, after "inner" delete --rim spacer outer-- and insert rim-spacer-outer; line 16, after "spaced" delete the hyphen; line 71, after "dual" delete the hyphen; line 72, after "cross" insert a hyphen;

Col. 2, line 17, after "U.S." insert [; line 18, after "1969" delete the comma and insert ]; line 19, after "granted" insert [; line 19, after "1969" delete the comma and insert ]; line 22, after "annular" delete --rimbase-- and insert rim base; line 23, after "the" delete --rimbase-- and insert rim base; line 26, after "the" delete --rimbase-- and insert rim base; line 33, after "the" delete

UNITED STATES PATENT OFFICE
CERTIFICATE OF CORRECTION

Patent No. 3,623,772          Dated November 30, 1971

Inventor(s) William D. Walther          PAGE - 2

It is certified that error appears in the above-identified patent and that said Letters Patent are hereby corrected as shown below:

--aforementioned-- and insert aforesaid;
line 33, after "U.S." insert [; line 33,
after "Pat. No. 3,421,797." insert ]; line
54, after "end" delete --thereon-- and insert
thereof; line 54, after "rim" delete hyphen;
line 55, after "rim" delete hyphen; line 61,
after "rim" delete hyphen; line 62, after
"rim" delete hyphen;

Col. 3, line 4, after "strength" delete --so--;
line 9, before "axially" delete --an-- and
insert the; line 22, after "spaced'' delete
the hyphen; line 25, after "dual" delete the
hyphen; line 28, after "rim" delete the hyphen;
line 29, after "rim" delete the hyphen;

UNITED STATES PATENT OFFICE
CERTIFICATE OF CORRECTION

Patent No. 3,623,772          Dated November 30, 1971

Inventor(s) William D. Walther          PAGE - 3

It is certified that error appears in the above-identified patent and that said Letters Patent are hereby corrected as shown below:

Col. 4, line 2, after "rim" delete the hyphen; line 3, after "rim" delete the hyphen; line 5, after "engaging" delete --said--; line 9, after "surface" delete --(27a)-- and insert (27b); line 14, after "spaced" delete the hyphen.

Signed and sealed this 20th day of June 1972.

(SEAL)
Attest:

EDWARD M. FLETCHER, JR.
Attesting Officer

ROBERT GOTTSCHALK
Commissioner of Patents